(12) United States Patent
Percer et al.

(10) Patent No.: US 7,174,470 B2
(45) Date of Patent: Feb. 6, 2007

(54) COMPUTER DATA BUS INTERFACE CONTROL

(75) Inventors: Benjamin Thomas Percer, Roseville, CA (US); Andrew Michael Cherniski, Rescue, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 429 days.

(21) Appl. No.: 10/685,250

(22) Filed: Oct. 14, 2003

(65) Prior Publication Data

US 2005/0077921 A1   Apr. 14, 2005

(51) Int. Cl.
G06F 1/00 (2006.01)
G06F 1/32 (2006.01)
G06F 11/30 (2006.01)
G06F 13/36 (2006.01)
H04L 12/50 (2006.01)

(52) U.S. Cl. ............... 713/300; 713/320; 713/324; 713/340; 710/306; 370/362

(58) Field of Classification Search ............. 713/300, 713/320, 324, 340
See application file for complete search history.

(56) References Cited

U.S. PATENT DOCUMENTS

| 5,586,271 | A | * | 12/1996 | Parrett ................ 710/302 |
| 5,990,575 | A |   | 11/1999 | Flaugher |
| 6,078,979 | A | * | 6/2000  | Li et al. .............. 710/312 |
| 6,414,533 | B1 | * | 7/2002 | Graves ................ 327/319 |
| 6,415,342 | B1 |   | 7/2002 | Wahl et al. |
| 6,441,595 | B1 |   | 8/2002 | Pelissier et al. |
| 2003/0120847 | A1 | | 6/2003 | Gasparik |

FOREIGN PATENT DOCUMENTS

WO   WO 00/34878   6/2000

OTHER PUBLICATIONS

"Bus Switch Undershoot Protection: Which Systems Need this Protection and Why", Fairchild Semiconductor Corporation, Application Note AN-500498, pp. 1-3 (2000).
"FSTU—Undershoot Protected Fairchild Switch Family", Fairchild Semiconductor Corporation, Application Note AN-500222, pp. 1-4 (2000).
"FSTU32160 16-Bit to 32-Bit Multiplexer/Demultiplexer Bus Switch with -2V Undershoot Protection", Fairchild Semiconductor Corporation, Application Note DS500244, pp. 1-6 (2000).
"Intel NetStructure ZT 4901 I/O Mezzanine Expansion Card" Intel Corporation, Product Brief, pp. 1-4 (2002).
"cPB-4321 PlexSys Family System Master Processor Board", Diversified Technology, Inc., Configuration Guide Rev 1.6, pp. 1-14 (2002).
Written opinion for PCT application No. PCT/US03/33781.

* cited by examiner

Primary Examiner—Lynne H. Browne
Assistant Examiner—Michael J. Brown

(57) ABSTRACT

A computer data bus interface control selectively connects a computer data bus to functional components of a circuit board or isolates the bus from the functional components. The bus interface control also selectively provides pull-up voltage to the bus, as needed. The connection selection and the pull-up voltage selection can be made, for example, based on whether the board is installed in a system slot or a peripheral slot of the bus.

42 Claims, 6 Drawing Sheets

COMPUTER DATA BUS INTERFACE CONTROL

BACKGROUND

1. Field of the Invention

The present invention relates generally to computer data buses and, more particularly, to computer data bus interface controls.

2. Related Art

Computer buses, such as the Compact PCI ("cPCI") bus, are used to distribute signals between or among components or subsystems. In some situations, components, such as I/O devices, memories or processors, are mounted on a common circuit board, and a bus interconnects the components. In other situations, circuit boards comprising entire subsystems, such as servers, switches or routers, plug into sockets (sometimes also referred to as "slots") in a backplane bus, which interconnects the boards. For example, cPCI buses are commonly used as backplanes to interconnect replaceable circuit boards (commonly referred to as "blades") in "blade systems."

A bus can be used for "point-to-point" communication between two circuit boards or components, or in situations where more than two circuit boards or components share a single bus. Some buses permit circuit boards to be "hot swapped" (installed or removed), while the buses and remaining circuit boards continue to operate. For simplicity, "board" or "circuit board" will hereinafter also refer to a component that is, or could be, connected to a bus. "Slot" will hereinafter refer to an electrical connection between a board and a bus, regardless of whether the connection is removable or permanent.

A bus typically includes a plurality of signal lines. Digital signals carried over the signal lines are typically represented by one of two voltages that represent logical HIGH ("1") and logical LOW ("0") signals. To minimize the effect of electrical noise on the signal lines, especially when no signals are being sent over the lines, each signal line is typically connected through a resistor to a positive DC voltage source. This "pull-up" circuit maintains the signal line at a logical HIGH level until a circuit board asserts a logical LOW signal on the signal line.

A cPCI bus includes two kinds of slots, which are commonly referred to as "system" slots and "peripheral" slots. A system slot (sometimes also referred to as a "host" slot) enables an installed circuit board to control the bus, such as by providing bus arbitration, clock signals and reset signals. A circuit board installed in a system slot is permitted to communicate over signal lines of the cPCI bus and is required to provide pull-up voltage on certain of the signal lines. On the other hand, according to the CompactPCI Specification, circuit boards installed in peripheral slots are typically prohibited from providing such pull-up voltage.

To take advantage of economies of scale in manufacturing circuit boards, and to provide customers with flexibility in using these circuit boards, many suppliers manufacture circuit boards that can operate as either system boards or peripheral boards, depending on the slots in which they are installed. These circuit boards are hereinafter referred to as "dual-mode boards." Each cPCI bus includes a signal line (designated "SYSEN#") that is asserted as a logical LOW in a system slot and is asserted as a logical HIGH in peripheral slots. Thus, a dual-mode board can ascertain the kind of slot in which it is installed by sensing the SYSEN# signal line.

When a dual-mode board is installed in a peripheral slot, it typically enters a mode commonly known as "drone mode" or "isolation mode," in which the board isolates itself from the cPCI bus and uses other interfaces, such as Ethernet or Fibrechannel, to communicate with other boards. Such a board typically employs a bus switch or other circuit containing field-effect transistors (FETs) on each signal line of the bus to selectively connect the board to the bus or isolate the board from the bus. These FETs can be turned ON to connect the circuit board to the bus, or they can be turned OFF to isolate the board from the bus.

CompactPCI boards are relatively small (100 mm×160 mm or 233.35 mm×160 mm), thus the area ("real estate") on these boards is extremely limited, particularly in cPCI-based server boards. Unfortunately, the FETs required to selectively connect or isolate a board to or from a bus require a considerable amount of space on the board ("real estate"), thus limiting the amount of real estate available for other functional circuits. There is, therefore, a need for a bus interface control that can selectively connect or isolate a board to or from a bus, without requiring as much board real estate as in conventional systems.

SUMMARY OF THE INVENTION

In one aspect of the present invention, a bus interface control for selectively supplying pull-up voltage to signal lines of a bus is disclosed. The bus interface control comprises a plurality of pull-up circuits. Each is connected to one of the signal lines and is isolated from the other pull-up circuits to prevent signals from the one of the signal lines passing through the pull-up circuit to another one of the signal lines. The bus interface control also comprises a multi-mode power source. In a first power mode, the multi-mode power source powers the plurality of pull-up circuits. In a second power mode, the multi-mode power source does not power the plurality of pull-up circuits.

In another aspect of the present invention, a bus interface control for selectively connecting signal lines of a first bus to a second bus is disclosed. The bus interface control comprises a plurality of pull-up circuits. Each pull-up circuit is connected to one of the signal lines of the first bus and is isolated from the other pull-up circuits by a diode to prevent signals from the one of the signal lines of the first bus passing through the pull-up circuit to another one of the signal lines of the first bus. The bus interface control also comprises a voltage regulator that can be selectively enabled by a voltage regulator enable signal. In a first power mode, the voltage regulator powers the plurality of pull-up circuits. In a second power mode, the voltage regulator does not power the plurality of pull-up circuits. The power mode is responsive to an enable signal of the first bus. The bus interface control also comprises a switchable bus bridge that is capable of operating in at least two bridging modes. In a first bridging mode, the switchable bus bridge connects at least some of the signal lines of the first bus to the second bus; in a second bridging mode, the switchable bus bridge does not perform such a connection. The bridging mode is also responsive to the enable signal of the first bus.

In yet another aspect of the present invention, a bus interface control for selectively connecting signal lines of a first bus to a second bus is disclosed. The bus interface control comprises a plurality of pull-up circuits. Each pull-up circuit is connected to one of the signal lines of the first bus. Each pull-up circuit is isolated from the other pull-up circuits by a diode to prevent signals from the one of the signal lines of the first bus passing through the pull-up circuit to another one of the signal lines of the first bus. The bus interface control also comprises a switch circuit operationally interposed between a power source and the plurality of pull-up circuits. In a first power mode, the switch circuit powers the plurality of pull-up circuits. In a second power mode, the switch circuit does not power the plurality of pull-up circuits. The power mode is responsive to an enable signal of the first bus. The bus interface control also comprises a switchable bus bridge that is capable of operating in at least two bridging modes. In a first bridging mode, the switchable bus bridge connects at least some of the signal lines of the first bus to the second bus. In a second bridging mode, the switchable bus bridge does not connect at least some of the signal lines of the first bus to the second bus. The bridging mode is responsive to the enable signal of the first bus.

In a further aspect of the present invention, a bus interface control for controlling an interface to a bus having a plurality of signal lines is disclosed. The bus interface control comprises isolation means for isolating each of the signal lines of the bus from other signal lines of the bus. The bus interface control also comprises pull-up means for selectively providing pull-up voltage to each of the signal lines of the bus.

In another aspect of the present invention, a method of controlling an interface to a bus having a plurality of signal lines is disclosed. The method comprises, in one power mode, providing pull-up voltage to each of the signal lines and, in another power mode, not providing the pull-up voltage. The method also comprises isolating each of the plurality of signal lines from other signal lines to prevent signals from any of the signal lines passing to another signal line.

In yet a further aspect of the present invention, a bus interface control for selectively supplying pull-up voltage to signal lines of a bus is disclosed. The bus interface control comprises a multi-mode power source capable of operating in at least two power modes. The bus interface control also comprises a plurality of pull-up circuits, each connected between one of the signal lines and the multi-mode power source. The bus interface control also comprises a plurality of diodes, each connected in series with one of the plurality of pull-up circuits and between one of the signal lines and the multi-mode power source and, thereby preventing current flowing in one direction through the one of the plurality of pull-up circuits. In a first power mode, the multi-mode power source powers the plurality of pull-up circuits and, in a second power mode, the multi-mode power source does not power the plurality of pull-up circuits.

DETAILED DESCRIPTION

The present invention selectively connects and disconnects (isolates) a bus to/from functional components of a board. The present invention also selectively supplies pull-up voltage to the bus, as needed. The bus connection selection and the pull-up voltage supply selection can be made, for example, based on whether the board is installed in a system slot or a peripheral slot of the bus. Alternatively, these selections can be made, for example, by a processor on the board, independent of the kind of slot in which the board is installed.

Figure 1:
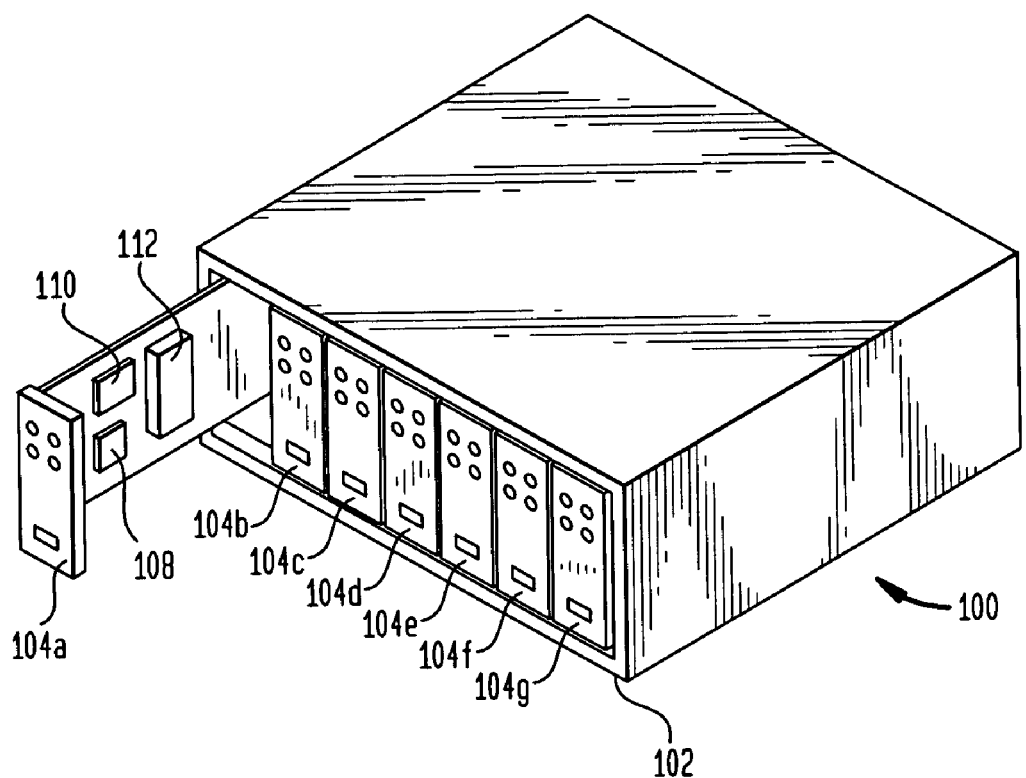
FIG. 1 is a perspective view of an exemplary blade system, in which aspects of the present invention can be implemented.

FIG. 1 is a diagram illustrating an exemplary blade system 100, in which embodiments of the present invention can be practiced. A chassis 102 houses blades 104a–g and other components of the blade system 100, such as power supplies and cooling fans (not visible). Blades 104a–g slide into the chassis 102 and plug into backplane bus slots (not visible). Each blade 104a–g includes a connector (not visible), by which it can connect to one of the slots. This connector can be an edge connector or a multi-pin header, plug or socket. Each blade 104a–g contains exemplary components 108, 110 and 112, such as processors, memory, network interfaces, disk drives, etc., depending on the blade's intended function.

Figure 2:
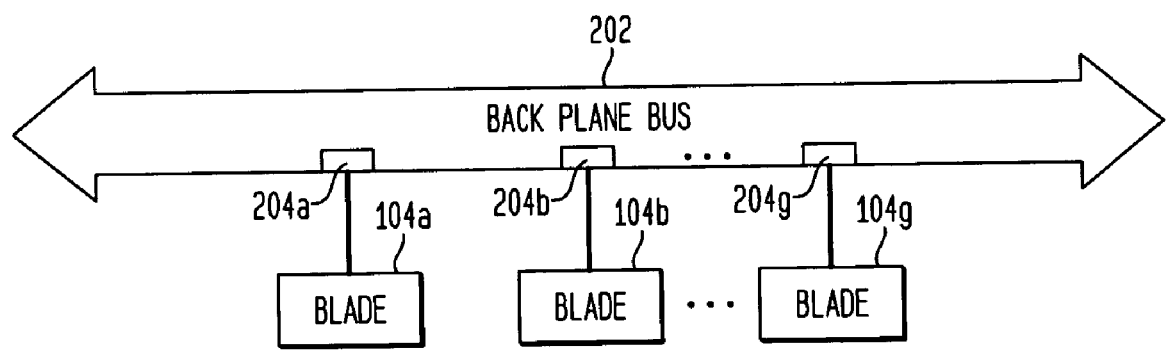
FIG. 2 is a block diagram of the blade system of FIG. 1.

FIG. 2 contains a block diagram of the blade system 100. A backplane bus 202 interconnects components of the blade system 100. In the exemplary blade system 100, the backplane bus is a CompactPCI (cPCI) bus, although other bus architectures can be used. The blades 104a–g plug into slots 204a–g of the backplane bus 202. (For consistency, blades are hereinafter referred to as "boards.")

In conventional systems, if a board, such as board 104a, were a dual-mode board, and the board were plugged into a peripheral slot, the board would enter drone mode. In drone mode, the board 104a would isolate itself from certain bus signal lines of the backplane bus 202. Otherwise, if the board 104a were plugged into a system slot, the board would not enter drone mode, and the board would connect itself to these bus signal lines.

Figure 3:
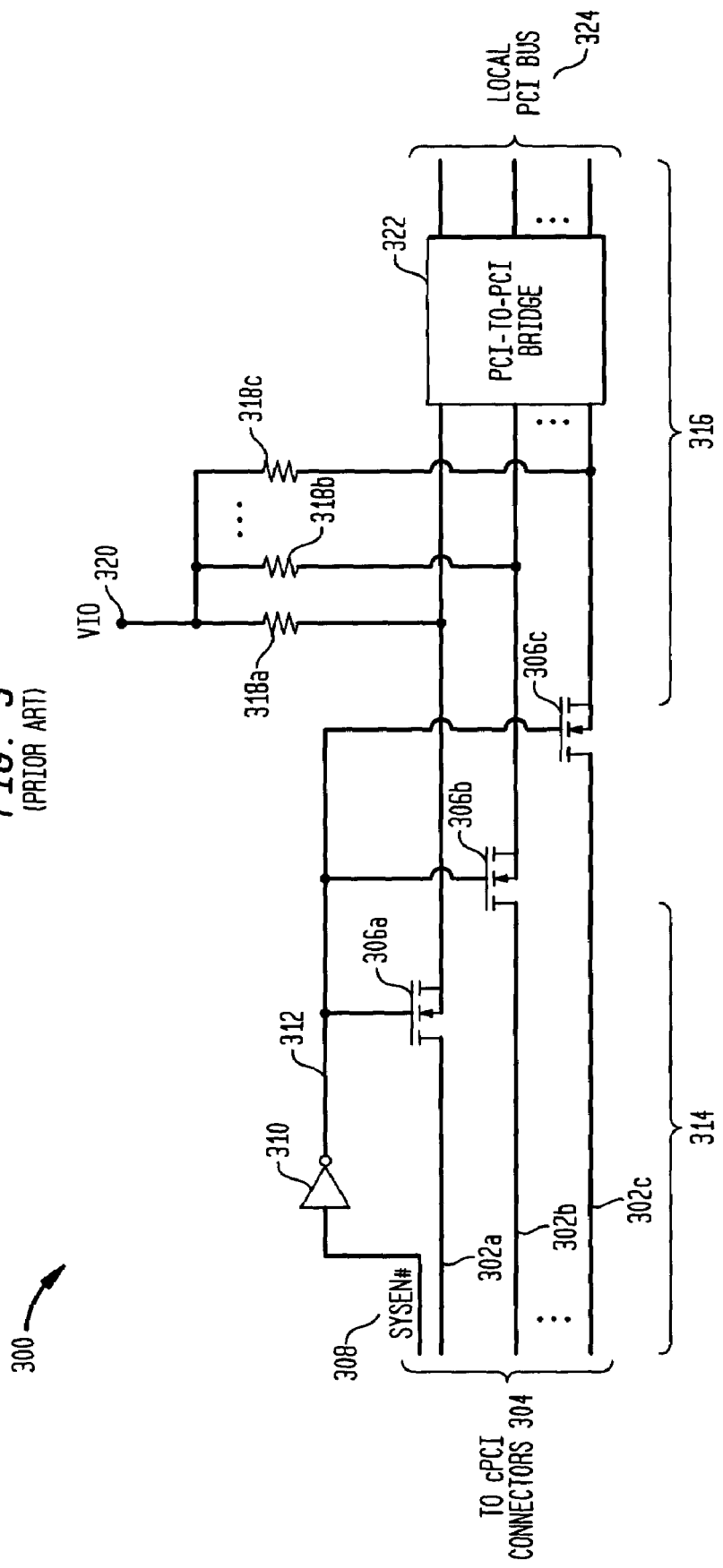
FIG. 3 is a simplified schematic wiring diagram of a conventional bus interface control portion of a blade (board) of FIGS. 1 and 2.

FIG. 3 is a simplified schematic wiring diagram 300 of a portion of the board 104a, specifically the portion that selectively isolates the board from the bus signal lines of the backplane bus 202 or connects the board to those signal lines. Signal lines 302a–c extend from cPCI connectors 304 to respective field-effect transistors (FETs) 306a–c. FETs 306a–c can be switched ON or OFF to either connect the signal lines 302a–c to the rest of the board 104a or to isolate the signal lines from the rest of the board.

In this exemplary application, in which the bus is a cPCI bus, a bus signal (designated SYSEN#) 308 is LOW in a system slot and HIGH in peripheral slots. This signal 308 drives an inverter 310, which in turn generates a drive signal 312 that drives the gates of FETs 306a–c. Thus, if the board 104a is connected to a system slot, the SYSEN# signal 308 is LOW, which causes drive signal 312 to be HIGH, which switches ON FETs 306a–c. Conversely, if the board 104a is connected to a peripheral slot, the SYSEN# signal 308 is HIGH, which causes drive signal 312 to be LOW, which switches OFF FETs 306a–c. Thus, the FETs 306a–c partition the signal lines 302a–c into a portion 314 that is always connected to the cPCI connectors 304, and a portion 316 that is connected to the cPCI connectors only when the board 104a is connected to a system slot. As previously discussed, the FETs 306a–c occupy a relatively large amount of real estate on the board 104a. Specifically, a large number of pins is required on integrated circuit packages that contain FETs which, in turn, occupy a relatively large amount of real estate on the board 104a.

A board that is connected to a system slot of a cPCI bus is required to provide pull-up voltage to the signal lines of the bus. In a conventional dual-mode board, pull-up resistors 318a–c are connected between a positive DC voltage source (VIO) 320 and the portion 316 of the signal lines 302a–c that is connected to the cPCI connectors only when the board 104a is connected to a system slot. A PCI-to-PCI bridge 322 connects the signal lines 302a–c to a local PCI bus or other circuitry 324 of the board 104a.

Figure 4:
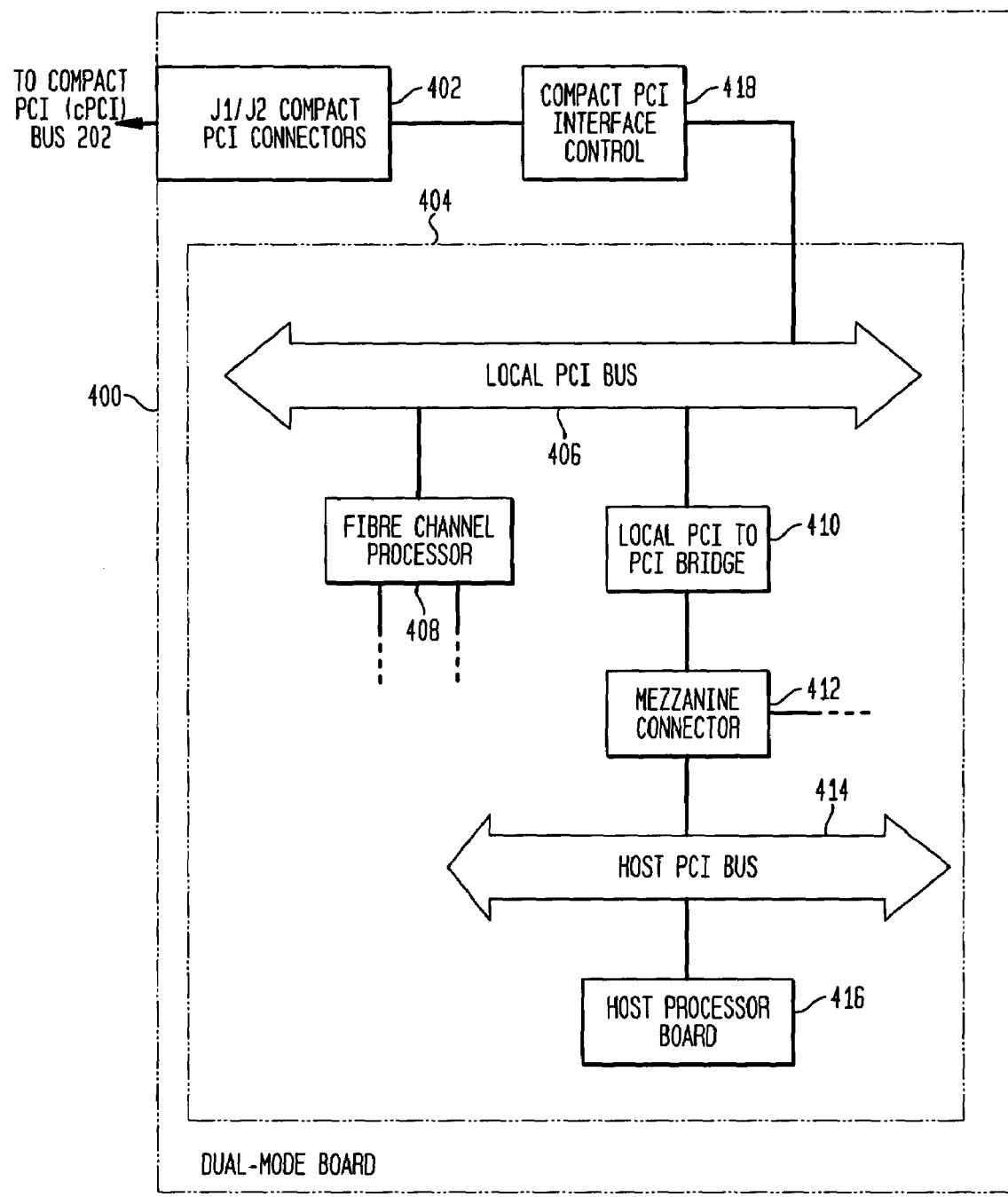
FIG. 4 is a block diagram of an exemplary blade (board), according to one embodiment of the present invention.

FIG. 4 is a block diagram of an exemplary dual-mode board 400, according to aspects of the present invention. The present invention will be explained using this exemplary dual-mode board 400, which connects to a cPCI bus, although the invention can be implemented with other bus architectures. The board 400 includes cPCI connectors 402, by which the board can be plugged into a slot of a cPCI backplane bus 202. The board 400 also includes functional components 404, such as a local PCI bus 406, Fibrechannel processor 408, local PCI-to-PCI bridge 410, mezzanine connector 412, host PCI bus 414 and host processor board 416, depending on functional requirements of the board, as is well known in the art.

In one embodiment of the present invention, board 400 includes a bus interface control 418. The bus interface control 418 selectively connects the cPCI connectors 402 to the functional components 404 of the board 400, or disconnects the cPCI connectors from these functional components. Bus interface control 418 also selectively supplies pull-up voltage to cPCI connectors 402, as needed. In addition, bus interface control 418 isolates signal lines of cPCI connectors 402 from each other.

Figure 5:
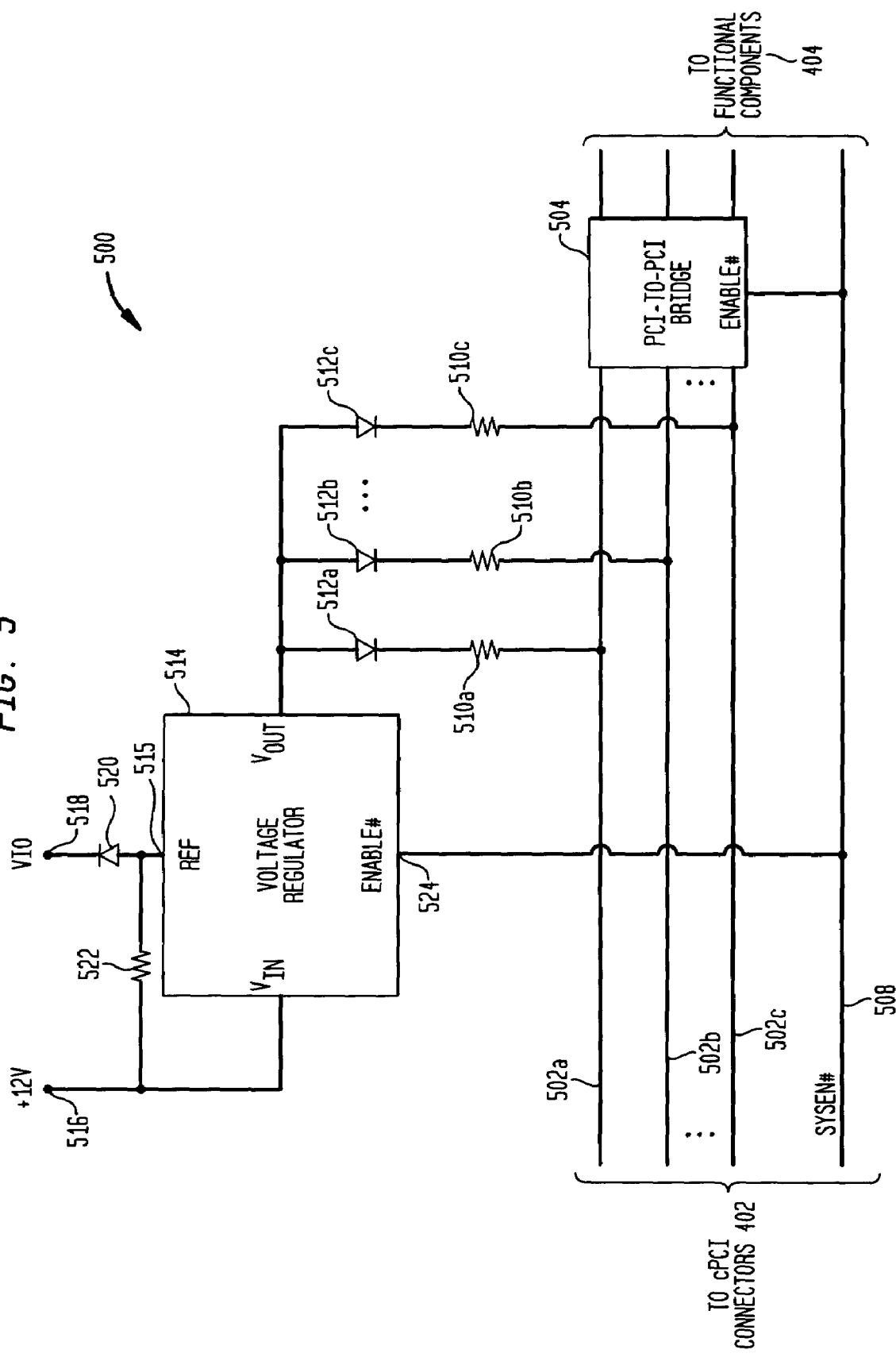
FIG. 5 is a simplified schematic wiring diagram of one embodiment of a bus interface control of FIG. 4.

FIG. 5 is a simplified schematic wiring diagram 500 of one embodiment of the bus interface control 418. Signal lines 502a–c (hereinafter collectively "signal lines 502") extend from the cPCI connectors 402 to a first side of a PCI-to-PCI bridge 504. A second side of the PCI-to-PCI bridge 504 is connected to the functional components 404 of the board 400, such as via local PCI bus 406 (FIG. 4). Alternatively, the second side of the PCI-to-PCI bridge 504 can be connected to functional components 404 via a PCI bus 406.

The PCI-to-PCI bridge 504 includes an ENABLE# input, by which the bridge can be controlled, i.e. the bridge can be opened to connect the signal lines 502 to the functional components 404, or the bridge can be closed to disconnect the signal lines from the functional components. The PCI-to-PCI bridge 504 is, therefore, switchable and operates in either of at least two modes. A suitable PCI-to-PCI bridge is commercially available from Intel Corporation, Santa Clara, Calif. under part number 21150.

The SYSEN# signal 508 of the backplane bus 202 is used to drive the ENABLE# input of the PCI-to-PCI bridge 504. Thus, if the board 400 is connected to a system slot, the board detects a LOW SYSEN# signal 508. Consequently, PCI-to-PCI bridge 504 opens and the functional components 404 can communicate, via the cPCI connectors 402, with the cPCI backplane bus 202. Conversely, if the board 400 is connected to a peripheral slot, the board detects a HIGH SYSEN# signal 508. In this case, PCI-to-PCI bridge 504 remains closed and the functional components 404 are not connected to the cPCI backplane bus 202. When the PCI-to-PCI bridge 504 is in its closed state, input/output lines of the first side of the bridge are set to a high impedance (commonly called "tri-state" or "high-Z") state, as is well-known in the art. In this high-Z state, the PCI-to-PCI bridge 504 asserts neither a logical HIGH or LOW signal on the signal lines 502 and, thus, does not influence communication over the cPCI backplane bus 202.

As previously mentioned, the bus interface control 418 supplies pull-up voltage to cPCI connectors 402, as needed. In the embodiment shown in FIG. 5, pull-up resistors 510a–c (hereinafter collectively "pull-up resistors 510") are connected, via diodes (preferably Schottky diodes) 512a–c, to a voltage regulator 514. The voltage regulator 514 is connected to a voltage source, such as +12 volt source 516. The voltage regulator 514 has a REF input 515, which is connected to a reference voltage source, such as VIO 518. Preferably, the REF input 515 is connected to the reference voltage source via a component, such as Schottky diode 520, that has voltage drop characteristics similar to diodes 512. Bias/current-limiting resistor 522 forward biases the Schottky diode 520, as described below. The voltage regulator 514 includes an ENABLE# input 524, by which the voltage regulator can be turned ON or OFF. This ENABLE# input 524 is connected to the SYSEN# signal line 508 of the backplane bus 202, so the voltage regulator supplies voltage to the pull-up resistors 510 if the board 400 is connected to a system slot, and does not supply voltage to the pull-up resistors if the board is connected to a peripheral slot.

The voltage regulator 514 is, therefore, a multi-mode power source, supplying power to the pull-up resistors 510 in one mode, and not supplying power to the pull-up resistors in another mode. A suitable voltage regulator is commercially available from National Semiconductor Corporation, Santa Clara, Calif. under part number LM723. Although this embodiment employs an integrated regulator, the voltage regulator can be implemented with discrete or integrated circuits, as long as it can be controlled to operate in at least two modes.

The Schottky diodes 512 isolate each of the signal lines 502 from the other signal lines. In relation to the present invention, isolation means preventing data signals from one of the signal lines, for example signal line 502a, from passing through pull-up resistors, for example pull-up resistors 510a and 510c, and entering another one of the signal lines, for example signal line 502c. This isolation can be provided by a diode, such as Schottky diode 512a, transistor or other suitable semiconductor (collectively hereinafter referred to as a "diode") for each signal line 502.

The pull-up voltage for the cPCI bus 202 is specified to be VIO, however each Schottky diode 512 produces a voltage drop of V(Schottky) across it when it is forward biased. To compensate for this voltage drop, the voltage regulator 514 should produce a VOUT voltage of VIO+V(Schottky). The Schottky diode 520 and the bias/current-limiting resistor 522 are preferably selected to produce a voltage across the Schottky diode 520 similar to the voltage drops across each of the Schottky diodes 512. Since the voltage across the Schottky diode 520 is added to the voltage of VIO 518, the reference voltage supplied to the voltage regulator 514 at its REF input 515 is VIO+V(Schottky). Thus, the voltage regulator supplies a pull-up voltage of VIO+V(Schottky). The voltage applied to resistors 510, therefore, is VIO.

Optionally, if a sufficiently high reference voltage source is available, the REF input 515 can be connected to this reference voltage source without Schottky diode 520. In this case, the reference voltage source should be high enough so the VOUT voltage from voltage regulator 514 meets the pull-up voltage requirements of the cPCI bus, despite the voltage drops occurring across Schottky diodes 512.

Voltage drops across Schottky diodes are somewhat temperature sensitive. The Schottky diode 520 is, therefore, preferably located near the other Schottky diodes 512, so all the Schottky diodes 520 and 512 operate at similar temperatures and, therefore, similar voltages appear across all these diodes. Thus, as the voltage drops across the Schottky diodes 512 due to changes in temperature, the voltage across the Schottky diode 520 changes by a similar amount. Consequently, the REF voltage 515 supplied to the voltage regulator 514 changes by a similar amount, and the VOUT voltage provided by the voltage regulator 514 changes by a similar amount. This insures that the voltage applied to resistors 510, therefore, is VIO over a range of operating conditions.

Figure 6:
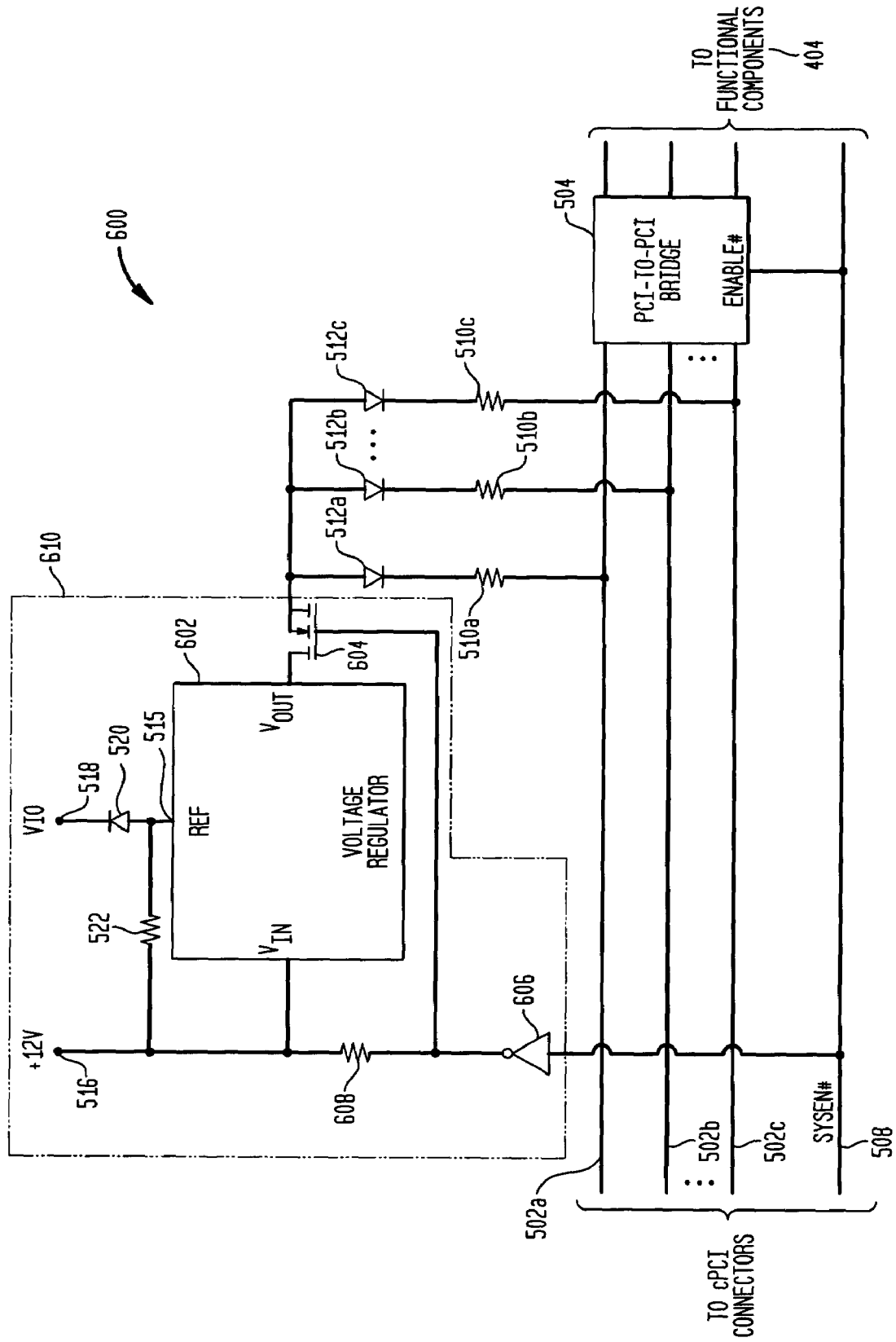
FIG. 6 is a simplified schematic wiring diagram of another embodiment of the bus interface control of FIG. 4.

FIG. 6 is a simplified schematic wiring diagram 600 of another embodiment of the bus interface control 418 (FIG. 4). For brevity, only differences between this embodiment and the embodiment shown in FIG. 5 are described. The pull-up resistors 510 are connected to a voltage regulator 602 via a field-effect transistor (FET) 604. This FET 604 acts as a switch, thereby providing a switch circuit between the voltage regulator 602 and the pull-up resistors 510. A relay, semiconductor or other suitable device capable of switching power to the pull-up resistors 510 could be used in place of the FET 604.

When the FET 604 is ON, the voltage regulator 602 supplies pull-up voltage to the pull-up resistors 510, and when the FET is OFF, the voltage regulator does not supply voltage to the pull-up resistors. An input to an open-collector inverter 606 is connected to the SYSEN# signal line 508. An output from the open-collector inverter 606 is connected through current-limiting resistor 608 to a voltage source, such as +12 volt source 516. The output from the open-collector inverter 606 is also connected to a gate of the FET 604 to control the FET. Thus, if the board 400 is connected to a system slot, the voltage regulator supplies voltage, via the FET 604, to the pull-up resistors 510, but if the board is connected to a peripheral slot, the voltage regulator does not supply voltage to the pull-up resistors. The voltage regulator 514, FET 604 and related components collectively form, therefore, a multi-mode power source 610. The signal from the output of the open-collector inverter 606 can be considered an enable signal to the FET 604 or to the combination of the voltage regulator 602 and the FET 604. A suitable voltage regulator is available from National Semiconductor Corporation, Santa Clara, Calif. under part number LM723.

Figure 7:
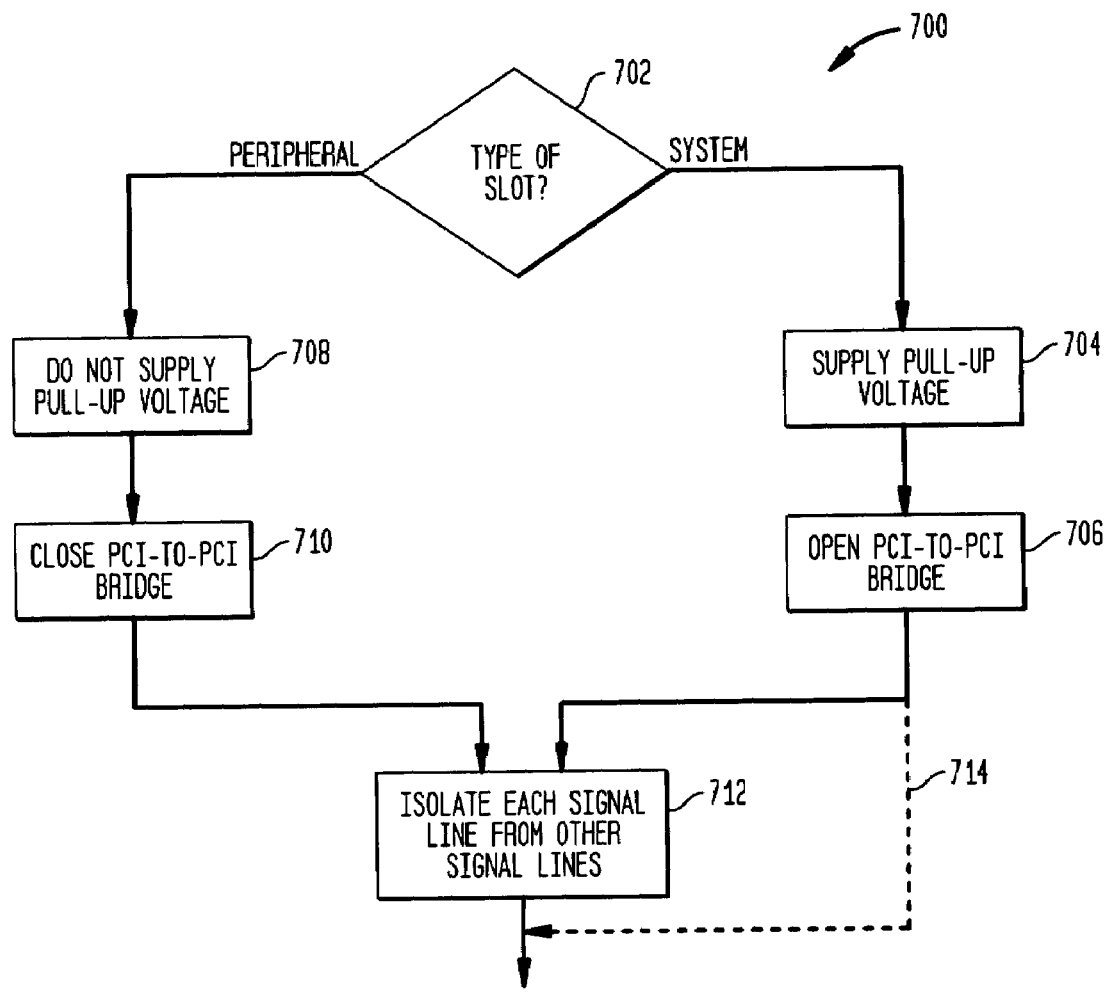
FIG. 7 is an exemplary flowchart illustrating operation of an embodiment of the present invention.

FIG. 7 contains an exemplary flowchart 700 illustrating operation of embodiments of the present invention, relative to a board and a bus. At decision 702, if the board is connected to a system slot, control passes to 704; if the board is connected to a peripheral slot, control passes to 708. At 704, pull-up voltage is supplied to pull-up resistors, such as by enabling a voltage regulator or turning ON a FET. At 706, a PCI-to-PCI bridge is opened, such as by supplying the bridge with an ENABLE# signal. At 708, voltage is not supplied to the pull-up resistors, such as by disabling the voltage regulator or turning OFF the FET. At 710, the PCI-to-PCI bridge is closed, such as by de-asserting the ENABLE# signal. At 712, each of the signal lines of the bus is isolated from the other signal lines of the bus, such as by providing Schottky diodes between the pull-up resistors and the voltage regulator. Alternatively, as shown by dashed line 714, the isolation need not be performed when the pull-up voltage is provided.

The embodiments described above preferably use Schottky diodes, because Schottky diodes are small and have relatively low forward voltage drop and relatively fast switching characteristics. Other diodes, transistors or other components that provide isolation between signal lines of a bus can, however, be used instead. Schottky diodes or other suitable components are smaller and less expensive than FETs. Furthermore, packages containing multiple diodes have fewer pins than switching circuits containing multiple FETs. Thus, the present invention provides advantages over conventional systems, in that embodiments of the present invention can be implemented less expensively than in conventional systems and these embodiments occupy less real estate on boards.

Although the embodiments described above derive enable signals for the voltage regulator, FET and PCI-to-PCI bus bridge from the SYSEN# signal line of a cPCI bus, the signals to enable the voltage regulator, FET and PCI-to-PCI bus bridge can be generated by other circuits, such as combinatorial logic circuits, processors, field-programmable logic arrays (FPLAs) or application-specific integrated circuits (ASICs). Furthermore, these enable signals need not be related to the SYSEN# signal. For example, a processor on a board can generate these enable signals, independent of the status of the SYSEN# signal.

Furthermore, other embodiments of the invention can be utilized on boards that connect to buses that do not include a SYSEN# signal line, such as non-cPCI buses. Thus, although the embodiments were described with reference to boards that connect to cPCI buses, other embodiments can be used with other bus architectures. Of course, suitable bus bridges would be substituted for the PCI-to-PCI bus bridges shown, with respect to the described embodiment. Other circuits or methods could be used to generate enable signals for the voltage regulator, FET and PCI-to-PCI bridge, as previously discussed. In addition, pull-up voltage need not be supplied at the same time as the bus bridge is opened. For example, the pull-up voltage can be supplied when the bus bridge is closed, and the voltage can be turned OFF when the bus bridge is opened, as required by the bus architecture.

The present invention was described with reference to pull-up resistors 510. Other components, such as transistors, or combinations of components can be used instead of pull-up resistors 510 to provide pull-up circuits, as long as they limit current flow and provide an appropriate bias voltage to signal lines 502. Optionally, if transistors are used in the pull-up circuits, the transistors can be switched ON or OFF to selectively provide the pull-up voltage. If this option is used, the voltage regulator need not be controllable via an ENABLE# input.

The bus interface control and other aspects of the present invention are preferably implemented in hardware. For example, the bus interface control can be implemented in a single integrated circuit or in a combination of integrated and/or discrete circuits. All or portions of the bus interface control can be implemented as combinatorial logic, an application-specific integrated circuit (ASIC) or a field-programmable gate array (FPGA).

Alternatively, the bus interface control and other aspects of the present invention can be implemented in software or firmware than can be stored in a memory and control operation of a control processor, a microprocessor embedded in another system or a computer, such as a personal computer. The memory can, but need not, be part of an integrated circuit that includes the control processor or microprocessor. The software or firmware can be stored on a removable or fixed computer-readable medium, such as a CD-ROM, CD-RW, DVD-ROM, DVD-RW, ZIP disk, hard disk or floppy disk. In addition, this software or firmware can be transmitted over a wireless or wired communication link, such as a computer or telephone network.

The terms and expressions employed herein are used as terms of description, not of limitation. There is no intention, therefore, in using these terms and expressions to exclude any equivalents of the features shown or described or portions thereof. Practitioners in the art will recognize further features and advantages of the invention based on the above-described embodiments and that other modifications are possible within the scope of the invention claimed. Accordingly, the invention is not to be limited by what has been particularly shown and described, except as indicated by the appended claims. All publications and references cited herein are expressly incorporated herein by reference in their entity.

What is claimed is:

1. A bus interface control for selectively supplying pull-up voltage to each of a plurality of signal lines of a bus, comprising:
   a plurality of pull-up circuits, each connected to a corresponding one of the signal lines and isolated from the other pull-up circuits to prevent signals from the corresponding one of the signal lines passing through the pull-up circuit to another one of the signal lines; and
   a multi-mode power source configured to connect to an enable signal line of the bus, wherein the power source, in response to an enable signal carried on the enable signal line, operates in one of at least a first and a second power mode; wherein in the first power mode the power source provides power at a particular voltage level to each of the plurality of pull-up circuits and wherein in the second power mode the power source does not provide power at the particular voltage level to the plurality of pull-up circuits.

2. The bus interface control of claim 1, wherein each pull-up circuit is isolated from the other pull-up circuits by a diode.

3. The bus interface control of claim 1, wherein each pull-up circuit is isolated from the other pull-up circuits by a Schottky diode.

4. The bus interface control of claim 1, wherein the multi-mode power source comprises a voltage regulator that can be selectively enabled the enable signal.

5. The bus interface control of claim 1, wherein the multi-mode power source comprises a switch circuit between a power source and the plurality of pull-up circuits.

6. The bus interface control of claim 5, wherein the switch circuit comprises a field-effect transistor.

7. The bus interface control of claim 1, further comprising a switchable bus bridge that is capable of operating in at least two bridging modes and, in a first bridging mode, connects at least some of the signal lines to a second bus and, in a second bridging mode, does not connect at least some of the signal lines to the second bus.

8. The bus interface control of claim 7, wherein the bridging mode is responsive to the enable signal of the bus.

9. The bus interface control of claim 7, wherein the plurality of pull-up circuits, the multi-mode power source and the switchable bus bridge are co-located on a removable circuit board.

10. The bus interface control of claim 7, wherein the bus is a Compact PCI bus.

11. The bus interface control of claim 1, wherein the plurality of pull-up circuits and the multi-mode power source are implemented in a single integrated circuit.

12. The bus interface control of claim 11, wherein the single integrated circuit further comprises a switchable bus bridge that is capable of operating in at least two bridging modes and, in a first bridging mode, connects at least some of the signal lines to a second bus and, in a second bridging mode, does not connect at least some of the signal lines to the second bus.

13. A bus interface control for selectively connecting signal lines of a first bus to a second bus, comprising:
   a plurality of pull-up circuits, each connected to a corresponding one of the signal lines of the first bus and isolated from the other pull-up circuits by a diode to prevent signals from the corresponding one of the signal lines of the first bus passing through the pull-up circuit to another one of the signal lines of the first bus;
   a voltage regulator configured to connect to an enable signal line of the bus, wherein the voltage regulator, in response to an voltage regulator enable signal carried on the enable signal line operates in one of at least a first and a second power mode, wherein in the first power mode the power source provides power at a particular voltage level to each of the plurality of pull-up circuits and wherein in the second power mode the power source does not provide power at the particular voltage level to the plurality of pull-up circuits; and
   a switchable bus bridge that is capable of operating in at least two bridging modes and, in a first bridging mode, connects at least some of the signal lines of the first bus to the second bus and, in a second bridging mode, does not connect at least some of the signal lines of the first bus to the second bus, wherein the bridging mode is responsive to the enable signal of the first bus.

14. The bus interface control of claim 13, wherein the bus is a Compact PCI bus.

15. The bus interface control of claim 13, wherein the diode is a Schottky diode.

16. A bus interface control for selectively connecting signal lines of a first bus to a second bus, comprising:
   a plurality of pull-up circuits, each connected to a corresponding one of the signal lines of the first bus and isolated from the other pull-up circuits by a diode to prevent signals from the corresponding one of the signal lines of the first bus passing through the pull-up circuit to another one of the signal lines of the first bus;
   a switch circuit between a power source and the plurality of pull-up circuits, wherein the power source and switch circuit are configured such that, in response to an enable signal carried on an enable signal line of the bus, the power source and switch circuit operate in one of at least a first and a second power mode, wherein in the first power mode the power source provides power at a particular voltage level to each of the plurality of pull-up circuits via the switch circuit and wherein in the second power mode the power source does not provide power at the particular voltage level to the plurality of pull-up circuit;
   a switchable bus bridge that is capable of operating in at least two bridging modes and, in a first bridging mode, connects at least some of the signal lines of the first bus to the second bus and, in a second bridging mode, does not connect at least some of the signal lines of the first bus to the second bus, wherein the bridging mode is responsive to the enable signal of the first bus.

17. The bus interface control of claim 16, wherein the bus is a Compact PCI bus.

18. The bus interface control of claim 16, wherein the diode is a Schottky diode.

19. The bus interface control of claim 16, wherein the switch circuit comprises a field-effect transistor.

20. A bus interface control for controlling an interface to a bus having a plurality of signal lines and an enable signal line, comprising:
isolation means for isolating each of the signal lines of the bus from other signal lines of the bus; and
pull-up means for selectively providing pull-up voltage to each of the signal lines of the bus;
wherein the interface operates in one of a least a first power mode and a second power mode based on an enable signal carried on the enable signal line of the bus;
wherein, in the first power mode, the pull-up means provides a pull-up voltage to each of the signal lines; and
wherein, in the second power mode, the pull-up means does not provide the pull-up voltage to the signal lines.

21. The bus interface control of claim 20, wherein the isolation means comprises a diode.

22. The bus interface control of claim 20, wherein the isolation means comprises a Schottky diode.

23. The bus interface of claim 20, wherein the pull-up means comprises a voltage regulator that can be selectively enabled by a voltage regulator enable signal.

24. The bus interface control of claim 20, wherein the pull-up means comprises a switch circuit between a power source and the signal lines.

25. The bus interface control of claim 20, wherein the switch circuit comprises a field-effect transition.

26. The bus interface control of claim 20, further comprising bus bridge means for selectively bridging at least some of the plurality of signal lines of the bus to a second bus.

27. The bus interface control of claim 26, wherein the bus bridge means is controlled based on the enable signal of the bus.

28. The bus interface control of claim 26, wherein the bus is a Compact PCI bus.

29. A method of controlling an interface to a bus having a plurality of signal lines and an enable signal line, comprising:
in a first power mode, providing pull-up voltage to each of the signal lines;
in a second power mode, not providing the pull-up voltage;
wherein the interface operates in either the first mode or the second mode based on an enable signal carried on the enable signal line of the bus; and
isolating each of the plurality of signal lines from other signal lines to prevent signals from any of the signal lines passing to another signal line.

30. The method of claim 29, wherein the isolating comprises blocking a signal with a diode.

31. The method of claim 29, wherein the isolating comprises blocking a signal with a Schottky diode.

32. The method of claim 29, wherein the providing pull-up voltage comprises enabling a multi-mode power source connected to the plurality of signal lines of the bus.

33. The method of claim 32, wherein the multi-mode power source comprises a voltage regulator that can be selectively enabled by a the enable signal.

34. The method of claim 32, wherein the multi-mode power source comprises a switch circuit between a power source and the plurality of signal lines of the bus.

35. The method of claim 34, wherein the switch circuit comprises a field-effect transistor.

36. The method of claim 29, further comprising:
in a first bridging mode, bridging at least some of the plurality of signal lines to a second bus and, in another bridging mode, not bridging the at least some of the signal lines to the second bus.

37. The method of claim 36, further comprising determining the bridging mode based on the enable signal of the bus.

38. A bus interface control for selectively supplying pull-up voltage to each of a plurality of signal lines of a bus, comprising:
a multi-mode power source capable of operating in at least a first and a second power mode, the multi-mode power source configured to connect to an enable signal line of the bus;
a plurality of pull-up circuits, each connected between a corresponding one of the signal lines and the multi-mode power source; and
a plurality of diodes, each connected in series with one of the plurality of pull-up circuits and between the corresponding one of the signal lines and the multi-mode power source and, thereby preventing current flowing in one direction through the corresponding one of the plurality of pull-up circuits;
wherein, in a first power mode, the multi-mode power source powers the plurality of pull-up circuits and, in a second power mode, the multi-mode power source does not power the plurality of pull-up circuits; and
wherein the multi-mode power source operates in the first or second power modes based on an enable signal carried on the enable signal line.

39. The bus interface control of claim 38, wherein each diode comprises:
a Schottky diode.

40. The bus interface control of claim 38, wherein the multi-mode power source comprises:
a voltage regulator having a voltage regulator enable signal input connected to the enable signal line of the bus.

41. The bus interface control of claim 38, wherein the multi-mode power source comprises:
a power source and
a switch circuit between the power source and the plurality of pull-up circuits, wherein the switch circuit has a switch circuit enable signal input connected to the enable signal line of the bus.

42. The bus interface control of claim 38, further comprising:
a switchable bus bridge connected between the signal lines and a second bus, wherein the switchable bus bridge is capable of operating in at least two bridging modes and has a bridge enable signal input connected to the enable signal line of the bus, whereby in a first bridging mode, the switchable bus bridge connects at least some of the signal lines to the second bus and, in a second bridging mode, the switchable bus bridge does not connect at least some of the signal lines to the second bus.

* * * * *

UNITED STATES PATENT AND TRADEMARK OFFICE
CERTIFICATE OF CORRECTION

PATENT NO. : 7,174,470 B2
APPLICATION NO. : 10/685250
DATED : February 6, 2007
INVENTOR(S) : Benjamin Thomas Percer et al.

It is certified that error appears in the above-identified patent and that said Letters Patent is hereby corrected as shown below:

In column 10, line 56, in Claim 16, delete "circuit;" and insert -- circuits; and --, therefor.

In column 11, line 62, in Claim 33, after "enabled by" delete "a".

Signed and Sealed this

Twenty-second Day of December, 2009

David J. Kappos
*Director of the United States Patent and Trademark Office*